INVENTOR.
HERBERT KIRCHNER

Aug. 6, 1968  H. KIRCHNER  3,395,586
INFINITELY VARIABLE, HYDRAULICALLY CONTROLLED
TRANSMISSIONS FOR MOTOR VEHICLES
Filed March 8, 1966  2 Sheets-Sheet 2

INVENTOR.
HERBERT KIRCHNER
BY Bailey, Stephens + Huettig
ATTORNEYS united States Patent Office 3,395,586
Patented Aug. 6, 1968

3,395,586
INFINITELY VARIABLE, HYDRAULICALLY CONTROLLED TRANSMISSIONS FOR MOTOR VEHICLES
Herbert Kirchner, Bad Homburg vor der Hohe, Germany, assignor to Reimers-Getriebe AG, Zug, Switzerland
Filed Mar. 8, 1966, Ser. No. 532,765
Claims priority, application Germany, Mar. 10, 1965, R 40,072
9 Claims. (Cl. 74—230.17)

ABSTRACT OF THE DISCLOSURE

An infinitely variable hydraulically controlled transmission for a motor vehicle has two pairs of conical pulley disks connected by an endless driving element. At least one disk of each pair is adjustable in the axial direction by a piston mounted in a cylinder and supplied with hydraulic fluid. A pendulum mounted on the vehicle for backward and forward movement in response to change in the speed of the vehicle controls a throttle valve in a pipe leading to the cylinders, in such a way as to increase the pressure and thereby to increase the transmission ratio of the transmission upon either acceleration or deceleration of the vehicle.

---

The present invention relates to improvements in an infinitely variable, hydraulically controlled transmission for a motor vehicle, and more particularly to a device for adjusting the speed of variation of such a transmission, in which this transmission comprises an endless driving element such as a chain or link belt and a pair of pulleys which are connected to each other by this driving element and each of which consists of a pair of conical pulley disks, wherein at least one disk of each pair is movable in the axial direction relative to the other disk by means of a hydraulically controlled bracing piston, the bracing pressure of which may be varied by a control valve which determines the fluid pressure which is exerted upon the piston.

Transmissions of this type as well as the conventional sliding shift gears are generally connected at one side to the engine by means of a clutch and at the other side to the driving wheels of the vehicle. However, while the speed ratio of one of the mentioned shift gears may be varied even when the vehicle is standing still, it is a disadvantage of the mentioned transmissions that they do not permit a variation of the speed ratio when the vehicle is not moving. Consequently, this requires the speed ratio of the transmission to be varied not only while the vehicle is standing still but also when it is moving and the clutch is disengaged so that the drive shaft of the transmission may run at a high speed and its driven shaft at a low speed. When the engine is idling, the transmission must therefore be shifted back automatically to the lowest speed and this adjustment must be completed before the vehicle is stopped. If this is not done, for example, because at a strong deceleration of the vehicle up to its stopping point there was not sufficient time for shifting the transmission to its lowest speed, it will be necessary to start the vehicle again at a higher speed ratio which may have the result that the engine will be overloaded and stalled. In the reverse case it may occur that the adjustment of the transmission to a higher speed will not occur at a strong acceleration of the vehicle as quickly as it should be possible in view of the output of the engine so that during the period of acceleration of the vehicle the engine will be subjected to an insufficient load and will therefore run up to such a high speed that it may be damaged.

Although the speed of adjustment of a transmission of this type will suffice for the normal operation of a vehicle, the damping ratio caused by the adjusting process will be too large when the vehicle is strongly accelerated or decelerated.

It is an object of the present invention to reduce this damping ratio in accordance with the acceleration or deceleration of the vehicle by increasing the speed of adjustment of the speed ratio of the transmission. This object is attained according to the invention by providing at least one throttling element within the circuit of the pressure fluid which acts upon the bracing pistons, and by providing suitable means for automatically varying the throttling effect of this element so that the quantity of fluid which is supplied to or discharged from the cylinders containing these pistons within a certain period of time will be enlarged in accordance with the increase or decrease of the prevailing vehicle speed in relation to time. The actual cross section of the hydraulic circuit is then made of such a dimension that the maximum damping effect of the throttling element together with the damping effect caused by resistance to the flow within the circuit will result in such a damping effect upon the speed of adjustment of the speed ratio of the transmission that this speed will be sufficient for the normal operation of the vehicle.

For reducing the damping effect of the throttling element, the invention employs the inertia of a mass which is moved by the motion of the vehicle. This mass may be designed so as to be movable back and forth in the direction of travel of the vehicle and to be acted upon by resilient means, for example, springs, which tend to hold it in a neutral position, and it may be connected to a valve member of a slide valve which at a deflection of the mass from its central position in one or the other direction will increase the cross-sectional size of the passage of the throttling element for the flow of the pressure fluid in accordance with the size of the deflection of this mass.

Although the device according to the invention may be of numerous designs, there are two embodiments thereof which are particularly preferred. According to one of these embodiments, the mass which is adapted to move back and forth consists of a pendulum like weight element which is suspended at and adapted to swing about a fixed point. Suitable means are provided for accurately adjusting the effective length of this pendulum and also for adjusting the tension of the springs for normally maintaining the pendulum and the valve member of the slide valve thereon in a neutral position and for returning them thereto. According to the second embodiment of the invention, the mass consists of a weight element which is guided so as to be movable back and forth in a straight direction, and the springs for normally maintaining this weight element in its neutral position and for returning it thereto act upon this element in opposite directions. A preferred feature of the invention consists in designing the valve member of the slide valve which is connected to the mass in a manner so as to extend transversely through a channel, one end of which is connected to the outgoing section and the other end to the incoming section of the conduit which connects the control valve to the cylinder of the bracing piston. The valve member of the slide valve is movable transversely to this channel, and when it is in its central or neutral position, it connects the two adjacent channel sections to each other by an aperture or passage of a smaller cross-sectional size and when it is located in at least one position to which it is shifted by the mass in one or the other direction from its central position, it connects the two adjacent channel sections to each other by an aperture or passage of a larger cross-sectional size. The passage of the smaller cross-sectional size may then connect the channel sections not only when the valve member of the slide valve is in its central position but also when it is moved to the positions away from this central position.

The features and advantages of the present invention will become more clearly apparent from the following detailed description thereof which is to be read with reference to the accompanying drawings, in which:

FIGURE 2 shows a diagrammatic cross section of the device according to the invention; while

Figure 1:
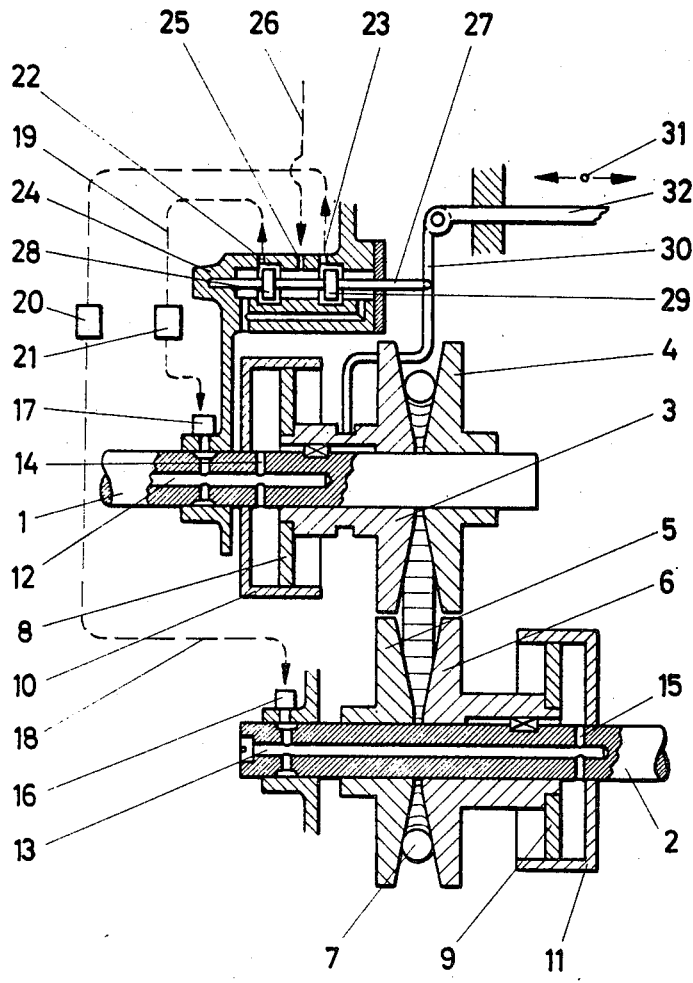
FIGURE 1 shows a diagrammatic cross-sectional view of a hydraulically controlled transmission of a known type of construction, in which the housing of the transmission is only indicated by several wall portions on which the means according to the invention for feeding the pressure fluid to the bracing cylinders and pistons and the housing for the control valve are mounted.

The infinitely variable transmission as illustrated in FIGURE 1 comprises a drive shaft 1 which is driven by the engine, for example, via an intermediate clutch, and a driven shaft 2. Each of these shafts carries a pair of conical pulley disks 3, 4 and 5, 6, respectively, which are connected by an endless driving element 7 such as a belt or link chain. The conical disks 4 and 5 are rigidly secured to the drive shaft 1 and the driven shaft 2, respectively, but the conical disks 3 and 6 are mounted on the drive shaft 1 and the driven shaft 2, respectively, so as to be nonrotatable but slidable in the axial direction relative thereto. The hub of disk 3 carries a piston 8 which is slidable within a cylinder 10, and the hub of disk 6 carries a piston 9 which is slidable within a cylinder 11. These two cylinders are rigidly secured to the shafts 1 and 2, respectively.

Shafts 1 and 2 are provided with central bores 12 and 13 for supplying a pressure fluid to the cylinders 10 and 11 through the radial bores 14 and 15. The pressure fluid is supplied to the central bores through the connections 16 and 17 and the conduits 18 and 19 in which the devices according to the present invention are provided for adjusting the speed of variation of the transmission. These devices will be subsequently described with reference to FIGURES 2 and 3. Conduits 18 and 19 are connected to outlet bores 22 and 23 of a control valve 24 which has an inlet bore 25 to which a pressure fluid is supplied through a conduit 26 from the sump of the transmission by a gear pump, not shown.

The control valve 24 which may be of a conventional design is provided with a control rod 27 which is connected to two control pistons 28 and 29 which are movable within chambers within the housing which are large enough so that the pressure fluid can flow around the control piston 29 and at the left of the control piston 28 are connected to outlet channels through which the pressure fluid may flow back to the sump of the transmission. The pressure fluid is supplied into the chamber between the two pistons. The peripheral edges of the end surfaces of control pistons 28 and 29 serve as control edges for the pressure fluid.

The control rod 27 is pivotally connected to a lever 30 which, in turn, is pivotally connected at one end to a draw rod 32 which is slidable in the direction of the double arrow 31, while its other end engages into an annular groove in the hub of the conical disk 3.

When the control pistons 28 and 29 are in their central position as illustrated in FIGURE 1, a part of the pressure fluid coming from the conduit 26 enters the pressure chambers of cylinders 10 and 11 through the bores 22 and 23 and the conduits 18 and 19, while the remainder of the pressure fluid enters the chambers at the right of control piston 29 and at the left of control piston 28 and then flows off to the sump of the transmission. Pistons 8 and 9 are therefore acted upon by a part of the pressure which prevails in conduit 26. Since in the central position of the control pistons the amount of pressure fluid flowing off within a certain period of time into the chamber at the right of control piston 29 is equal to the amount which passes into the chamber at the left of control piston 28, the pressures in the pressure chambers of both cylinders 10 and 11 are equal and thus also the bracing forces which act in the axial direction upon the conical disks 3 and 6.

If the draw rod 32 is moved toward the right, lever 30 will at first turn about the point of engagement of its lower end in the annular groove in the hub of the conical disk 3.

This point is at first a fixed point since the conical disk 3 is prevented by the driving element 7 from moving toward the right and by the pressure prevailing in cylinder 10 from moving toward the left. Consequently, the control rod 27 will also move toward the right, and the control piston 28 progressively reduces the flow of pressure fluid from the chamber between the control pistons into the chamber at the left of the control piston 28. This, in turn, means that the cross-sectional area within the chamber at the left of control piston 28 increases accordingly so as to admit the pressure fluid from the conduit 19. The pressure within chamber 10 therefore decreases practically to zero.

The pressure conditions in cylinder 11 are exactly the opposite. The discharge of pressure fluid into the chamber at the right of the control piston 29 will then be progressively reduced, while the cross-sectional area of the passage of the pressure fluid from the chamber between the control pistons into the bore 23 and the conduit 18 increases so that the pressure in cylinder 11 also increases. This has the result that the conical disk 6 moves toward the conical disk 5. The driving element 7 between the conical disks 5 and 6 is thereby pressed outwardly and penetrates at the same time more deeply between the conical disks 4 and 3 and thereby shifts the disk 3 slightly toward the left. This shifting movement of disk 3 is now possible because there is practically no pressure remaining in the cylinder 10. Consequently, lever 30 is also pivoted and thereby shifts the control rod 27 toward the left to such an extent that the control pistons 28 and 29 will be returned to their basic positions. When the movement of the draw rod 32 toward the right occurs again, the series of operations as above described is repeated until the driving element 7 finally engages with the smallest possible diameter with the conical disks 3 and 4 and with the largest possible diameter with the conical disks 5 and 6. The drive shaft 1 will then run at a maximum speed and the driven shaft 2 at a minimum speed so that the power will be transmitted from the engine to the driving wheels of the car at the lowest speed ratio. If the draw rod 32 is not shifted in steps toward the right, as assumed above, but by a continuous movement, the control rod 27 will, of course, remain in the position to which it has been shifted toward the right and the lever 30 will turn about the pivot point at which it is connected to the control rod 27. In this case, the control rod 27 will not return to the basic position as illustrated in FIGURE 1 until the lowest transmission ratio has been reached. For shifting the transmission to higher speeds, the draw rod 32 is shifted toward the left and the proceedings as above described will then occur in the reverse order.

Draw rod 32 is connected to the governor of the engine or to a lever which may be operated by the driver in such a manner that in the idling position of the engine the draw rod will be shifted as far as possible toward the right, while in the full-load position of the engine it will be shifted as far as possible toward the left. Transmissions of the type as above described are generally also provided with torque-responsive pressure-applying or contact-pressure devices which are not shown in FIGURE 1 for the sake of clearness of the illustration. Thus, for example, a responsive pressure-applying device which is associated with the driven shaft 2 would produce the result that the back pressure which would be exerted by the conical disk 6 upon the driving element 7 would increase when the load torque on shaft 2 increases so that the driving element 7 would tend to penetrate more deeply between the conical disks 3 and 4 and disk 3 would thereby be shifted slightly toward the left. If the draw rod 32 is held in a fixed position, the control rod 27 would therefore be likewise moved toward the left and the fluid pressure in cylinder 10 would increase so that a state of balance would again exist and the control rod 27 would return to its basic position. The conical disk 3 would then also be shifted toward the right for approximately the same distance which it was previously shifted toward the left. Since it is a requirement that these operations should not cause any noticeable changes in the transmission ratio, it results that the total distance of the stroke of the control rod must be quite small. This, in turn, means that the throttling or damping effect of the control valve is very considerable. This damping effect is increased by the flow resistance which occurs in the conduits of the fluid circuit. All of these damping effects together have the result that, although the speed of variation of the transmission would be sufficient for a normal operation of the vehicle, it would not suffice if a strong acceleration or deceleration of the vehicle occurs. The present invention therefore provides the devices 20 and 21 for the purpose of increasing the speed at which the transmission ratio may be varied by reducing the flow resistances in the fluid conduits.

Figure 2:
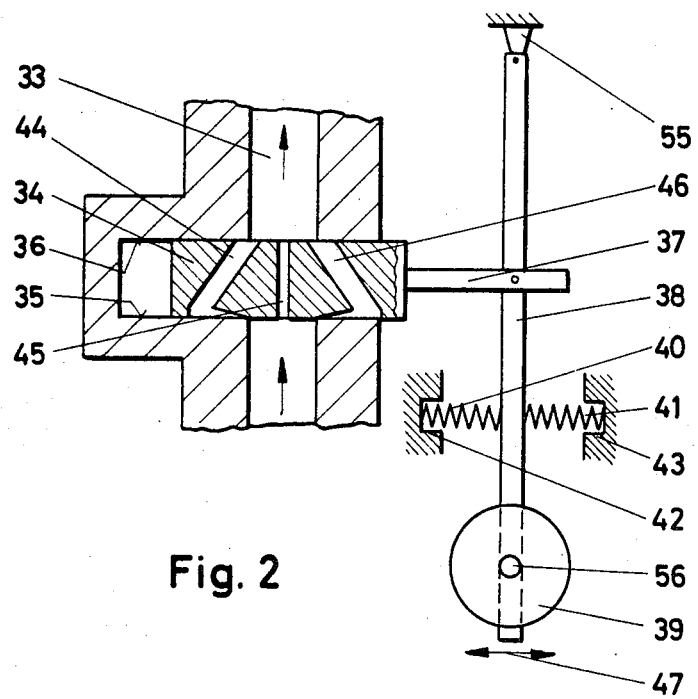
Figure 3:
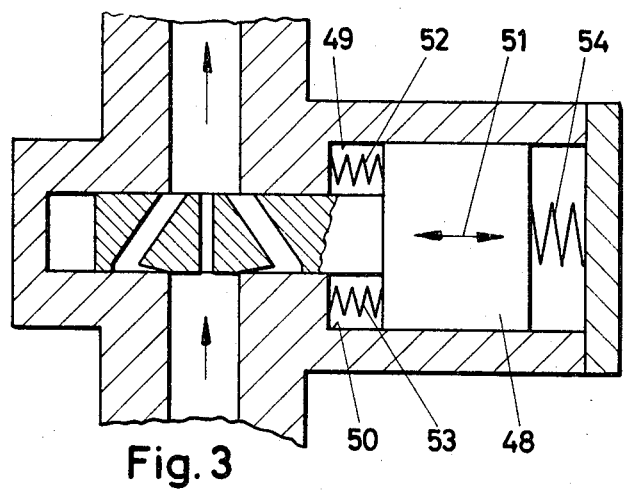
FIGURE 3 shows a diagrammatic cross section of a modification of the device according to the invention.

There are two different embodiments of these devices diagrammatically illustrated in FIGURES 2 and 3. Both of them form gate valves in the form of slide valves. The channel 33, as shown in FIGURE 2, forms a part of the conduit 18 or 19, respectively. It is interrupted by a slide-valve member 34 which is guided between guide surfaces 35 and 36 in the valve housing. Slide member 34 is pivotably connected by means of a connecting rod 37 to the rod 38 of a pendulum, the weight of which is indicated at 39. This pendulum is suspended on a fixed point 55 so that its plane of oscillation extends in the direction of movement of the vehicle. The pendulum rod 38 will normally be held in the central position as illustrated in FIGURE 2 by springs 40 and 41, the tension of which may be adjusted by mounting the spring caps 42 and 43 on which their outer ends are supported on setscrews, not shown, and by shifting them in the direction toward or away from the pendulum rod 38. The pendulum weight 39 may be shifted along the pendulum rod 38 in a similar manner as in a pendulum clock and be clamped tightly in the adjusted position by means of a setscrew 56. Slide member 34 has a straight central bore 45 and two inclined channels 44 and 46. The diameter of bore 45 is made of such a size that the flow resistance which will occur in conduit 18 or 19 will be of such a value that the speed of variation of the transmission will be sufficient for the normal operation of the vehicle.

Channels 44 and 46 have a considerably larger cross-sectional size than the bore 45 and are made of such a shape that, when the slide member 34 is in its central position as shown in FIGURE 2, one of the ends of each of these channels is covered up and closed by the guide surfaces 35 of the valve housing so that the fluid can no longer flow through these channels. When the vehicle is driven at a uniform speed, the pressure fluid will flow only through the central bore 45. If the vehicle is strongly accelerated or slowed down, the pendulum 38, 39 will swing in one or the other direction and thereby shift the slide member 34 so that the pressure fluid can flow not only through the bore 45 but also through the channel 44 or 46 since the end of one or the other of these channels which was previously covered by a guide surface 35 will then be shifted so as to be in connection with the channel 33. The flow resistance is thereby considerably reduced and the adjusting speed of the transmission is accordingly increased. If the vehicle is stopped or travels at a uniform speed, the pendulum and the slide member 34 return to their central position. The pressure fluid may then flow again only through the bore 45, whereby the flow resistance in conduit 18 or 19 for the normal operation of the transmission will again be attained and the transmission will again operate at its normal adjusting speed.

Theoretically, the springs 40 and 41 may also be omitted since a pendulum will return automatically to its central position. However, it is advisable to provide these springs because of the resistance which is caused by the movements of the slide member 34.

The modification of the invention as illustrated in FIGURE 3 differs from the embodiment according to FIGURE 2 only by the fact that in place of the pendulum a weight element 48 is provided which is rigidly secured to the slide member and slidable between guide surfaces 49 and 50 in a direction which must be the same as the direction of travel of the vehicle. When the vehicle is accelerated or slowed down, the weight element 48 is shifted against the action of the springs 52 and 53 or the spring 54 in one or the other direction, as indicated by the double arrow 51.

Depending upon whether the device according to the invention should be responsive only to a deceleration or only to an acceleration of the vehicle, one on the other of the channels 44 or 46 may be omitted. Assuming that the normal movement of the vehicle occurs from the left toward the right, channel 46 may be omitted if the device should be responsive only to decelerations of the vehicle. In the other case, channel 44 will not be required.

The devices 20 and 21 according to FIGURE 1 may also be combined within a single housing which would then be provided with two channels 33 next to each other, each of which would be controlled by a separate slide member 34. For moving both slide members, a common pendulum 38, 39 or a common weight element 48 may then be employed. On the other hand, for adjusting the speed of variation of the transmission it may also suffice to provide a device according to FIGURE 2 or FIGURE 3 in only one of the conduits 18 or 19.

Although my invention has been illustrated and described with reference to the preferred embodiments thereof, I wish to have it understood that it is in no way limited to the details of such embodiments but is capable of numerous modifications within the scope of the appended claims.

Having thus fully disclosed my invention, what I claim is:

1. In an infinitely variable, hydraulically controlled transmission for a motor vehicle having two pairs of conical pulley disks, an endless driving element wound around and connecting said two pairs of disks, at least one cylinder and a hydraulic bracing piston movable within said cylinder for adjusting at least one disk of each pair in the axial direction, a fluid circuit for said cylinder and piston, and a control valve adapted to determine the fluid pressure acting upon said piston and to adjust the bracing pressure of said piston, a device for adjusting the speed of variation of said transmission, said device comprising at least one throttling element within said fluid circuit for said bracing pistons, means responsive to a change in the speed of the vehicle for adjusting the throttling effect of said throttling element to increase the amount of pressure fluid supplied to and discharged from the pressure chambers of said cylinders in response to an increase or decrease of the vehicle speed.

2. A transmission as defined in claim 1, in which said throttling element and said means for adjusting the throttling effect thereof comprise at least one valve within said fluid circuit, a valve member adjustable within said valve, and a mass movable together with the vehicle and having an inertia adapted to adjust said valve member for varying the throttling effect thereof.

3. A transmission as defined in claim 2, further comprising means for mounting said mass so as to be able to reciprocate in the direction of travel of the vehicle, resilient means for normally maintaining said mass in a neutral position and for returning it thereto after it has been moved from said neutral position by the movement of said vehicle, said valve having fluid passage means, said valve member forming a slide member connected to said mass so as to be movable thereby and adapted when said mass is moved out of said neutral position to enlarge the cross-sectional size of said passage means in accordance with the distance of the movement of said mass from said neutral position.

4. A transmission as defined in claim 2, in which said mass comprises a weight member forming a pendulum, means for suspending said pendulum at a fixed point so as to swing thereon substantially in the direction of travel of the vehicle, spring means for normally maintaining said pendulum in a central position and for returning it thereto after it has been moved from said central position by the movement of said vehicle, said valve having fluid passage means, said valve member forming a slide member pivotably connected to said pendulum so as to be movable thereby and adapted when said pendulum is moved out of said central position to enlarge the cross-sectional size of said passage means in accordance with the distance of the movement of said pendulum from said central position.

5. A transmission as defined in claim 4, further comprising adjusting means for varying the effective length of said pendulum.

6. A transmission as defined in claim 3, in which said resilient means comprise spring means, and means for adjusting the initial tension of said spring means.

7. A transmission as defined in claim 2, in which said mass comprises a weight member, means for guiding said weight member so as to be movable back and forth in a straight direction substantially in accordance with the direction of travel of said vehicle, at least one pair of springs acting in opposite directions upon said weight member for normally maintaining the same in a substantially central position within said guide means and for returning it to thereto after it has been moved from said central position by the movement of said vehicle, said valve having a fluid passage, said valve member forming a slide member connected to said weight member so as to be movable thereby and adapted when said weight member is moved out of said central position to enlarge the cross-sectional size of said passage in accordance with the distance of the movement of said weight member from said central position.

8. A transmission as defined in claim 3, in which said fluid circuit comprises conduits connecting said control valve to said cylinders containing said bracing pistons, said valve having a channel having one end connected to the outgoing section and the other end to the incoming section of said conduits, said slide member crossing said channel and being movable transversely to said channel and having one passage of a smaller cross-sectional size and at least one passage of a larger cross-sectional size, said smaller passage connecting the two adjacent sections of said channel with each other when said valve member is in said neutral position, and said larger passage connecting the two adjacent channel sections with each other when said valve member is located in at least one position to which it is shifted by said mass in one or the other direction from said neutral position.

9. A transmission as defined in claim 8, in which said smaller passage connects said channel sections with each other when said slide member is located in said neutral position and also when said slide member is moved to positions away from said neutral position.

References Cited

UNITED STATES PATENTS 3,043,152  7/1962  Karig et al. _____ 74—230.17

FOREIGN PATENTS 1,304,112  4/1962  France.

C. J. HUSAR, *Primary Examiner.*